July 31, 1934. R. A. NORLING 1,968,536
BALANCER
Filed March 16, 1931
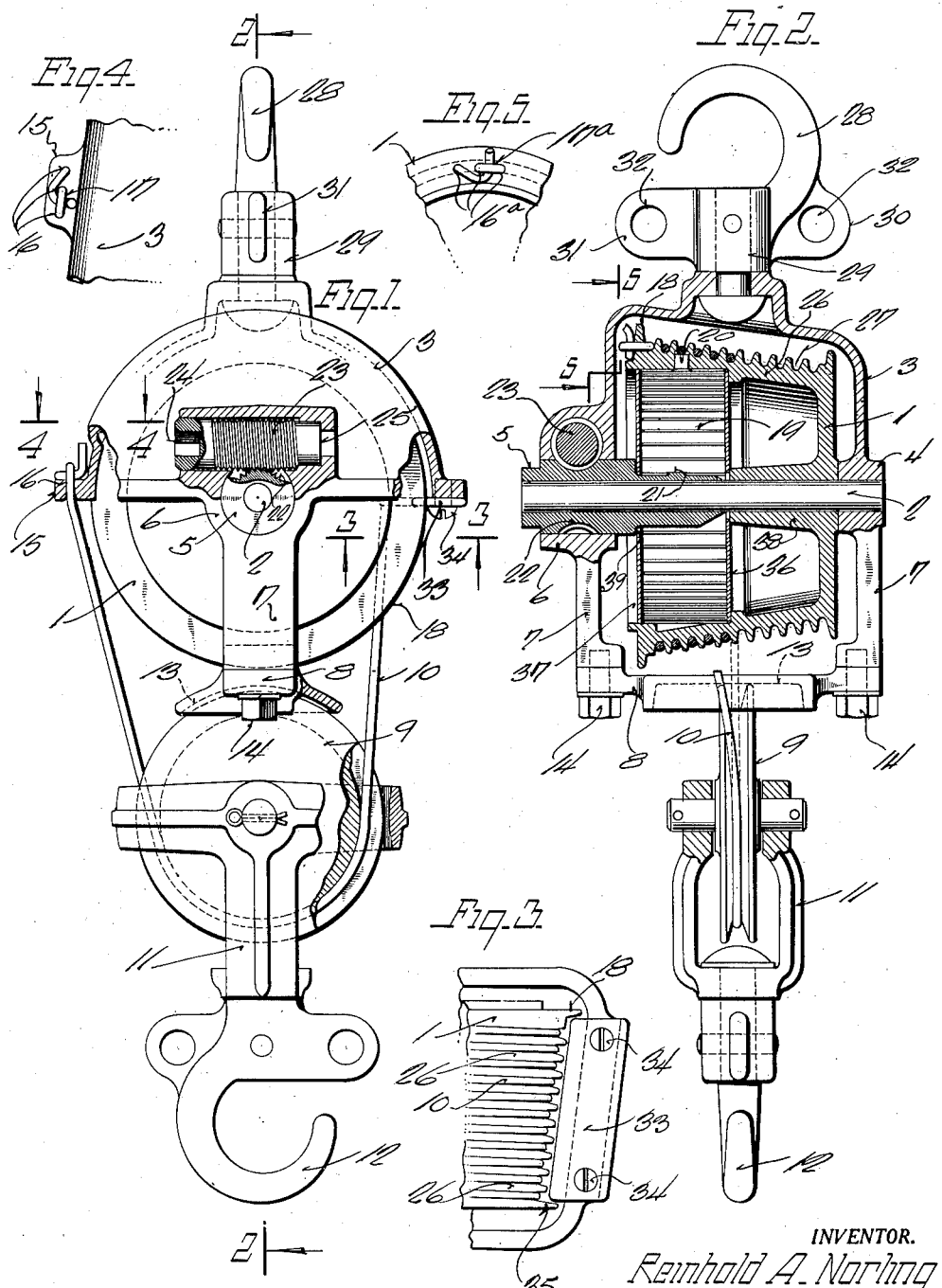
INVENTOR.
Reinhold A. Norling
BY
ATTORNEYS.

Patented July 31, 1934

1,968,536

UNITED STATES PATENT OFFICE 1,968,536

BALANCER

Reinhold A. Norling, Aurora, Ill., assignor to Independent Pneumatic Tool Co., Chicago, Ill., a corporation of Delaware Application March 16, 1931, Serial No. 523,164

8 Claims. (Cl. 242—107)

This invention relates to counter-balances, particularly adapted for use in factories and shops for suspending portable power-driven tools, such as electric drills and the like, from an overhead support above the places of work, whereby the tools when not in use are elevated out of the way, but may be readily drawn down to the work when desired.

One object of my invention is to provide a counter-balance in which the spring controlled reel or drum for the cable has an inclined or tapered cable carrying portion for varying the leverage on the spring in the turning of the reel and thus balance the load or tool suspended from the cable at its different distances from the reel, as well as relieving the operator of any undue strain or or effort in raising or lowering the tool.

Another object of my invention is to provide novel means for adjusting the tension of the spring of the counter-balance and for holding the spring at its adjusted tension.

A further object of the invention is to provide a stop or abutment on the lower side of the balancer to prevent the load or suspending member therefor striking the reel in the raising of the load.

A further object of the invention is to provide a guard for the reel to prevent the cable from improperly winding thereon.

The invention consists further in the matters hereinafter described and claimed.

In the accompanying drawing:—

Fig. 1 is a side view, with parts broken away and in section, of a balancer constructed in accordance with my invention;

Fig. 2 is a vertical sectional view, with parts in elevation, taken on line 2—2 of Fig. 1;

Fig. 3 is a bottom plan view taken on line 3—3 of Fig. 1 to show the cable guard for the reel;

Fig. 4 is a top plan view taken on line 4—4 of Fig. 1, to show the manner in which one end of the cable is attached to the frame of the balancer; and Fig. 5 is a view taken on line 5—5 of Fig. 2 to show the manner in which the other end of the cable is attached to the reel.

In the drawing, 1 indicates the reel or drum of the balancer, 2 the shaft on which the reel is rotatably mounted, and 3 the support for the shaft, which support is in the form of a frame or casing, housing or covering the upper half only of the reel, as shown. The shaft 2 extends across the casing 3 between the side walls thereof and is held against rotation in the casing in any desired manner, as by having a driving fit in a tubular boss 4 on one side of the casing. The other end of the shaft is supported in a sleeve 5 rotatably mounted in a boss 6 on the other side of the casing. The sleeve 5 forms a part of the spring tension adjusting means to be presently described.

The casing 3 has side arms 7, 7 extending downward from the bosses 4, 6 to a point below the reel 1 where said arms form a support for a cross-member or bar 8. The latter extends between the arms beneath the reel and provides a stop or abutment to prevent the sheave 9 carried in the loop of the cable 10 from striking the reel when lifted too far. The sheave 9 is journaled in a suitable block or frame 11, which is provided on its lower side with a swiveled hook 12 by means of which a portable power operated tool or other load used with the balancer may be suspended therefrom. As shown in Fig. 1, the bar 8 is provided with a relatively wide concave recess 13 on its under side to conform to the curvature of the sheave 9, and thus provide an effective stop or abutment for the sheave when brought in contact with the bar. The bar 8 is preferably connected to the arms 7 by means of screws or other releasable attaching members 14, 14, so that the bar can be connected to or be removed from the arms in the assembling or disassemblying of the device.

One end of the cable 10 is fastened to the casing or support 3 and the other end to the reel or drum 1. These connections are shown in Figs. 4 and 5, respectively. As shown in Fig. 4, the casing 3 is provided at one side with an outwardly extending lug 15, provided with three spaced holes 16, through which the cable is passed to provide a loop 17 on the upper side of the lug, and through which loop the free end portion of the cable is inserted for fastening the cable to the lug. The same arrangement is provided for attaching the other end of the cable to the drum or reel 1. The three holes 16a are formed in a peripheral flange 18 at one end of the drum, and the free end of the cable is inserted through the loop 17a provided on the outer side of this flange. The form of attaching means for cable, shown and described, makes an effective connection without the use of additional or complicated clamping devices, and moreover insures a secure connection because the greater the load or weight on the cable the tighter the clamping action will be.

The cable having its opposite ends attached to the casing and reel, respectively, provides a loop in the cable below the reel for the load carrying sheave 9, and thus permits the cable to carry a greater load without danger than should only one strand of cable be employed. Moreover, with the loop in the cable as the support for the sheave, the latter will hang centrally of the balancer, and thus permit the balancer attaching element on the upper side of the balancer to be positioned centrally thereof, instead of being offset to one side of the center to be in line with the load supporting strand of the cable when only one strand is used.

Located in the reel 1 is a single flat coil spring 19. The outer end of the spring is rigidly connected to the inner surface of the reel by rivet 20 or other desired fastening means. The inner end of the spring is attached by means of a key 21 to the sleeve 5 which extends into the center of the spring, as shown in Fig. 1. The portion of the sleeve 5 within the boss 6 is provided with teeth 22 similar to those of a worm gear. A plug 23 is journaled in the boss 6 above the sleeve 5 and has screw threads engaging the teeth of the sleeve for turning it to adjust the tension of the spring 19 by winding or unwinding it, as required. One end of the plug or worm 23 is accessible from the exterior of the boss 6, and is there provided with a square or other non-circular socket 24, whereby a suitable tool may be engaged with the plug or worm for turning it. The screw threads on the plug are so arranged that the tendency of the spring to unwind to loose its tension will be resisted by the plug or worm being forced against the end wall 25 at the inner end of the socket in which the plug is located.

The reel 1 is made in the form of a relatively wide cylinder, the annular wall 26 of which provides a support for the cable 10. A spiral groove 27 is formed in the exterior surface of said wall 26 to lead the cable onto and off the reel in the use of the device. The wall 26 is tapered or inclined to the axis of the reel, as provided by the shaft 2, so that the reel is larger in diameter at one end than at the other. The groove 27 extends from one end of the reel to the other so that the cable on winding on the reel will progress from the smaller to the larger end of the reel and on unwinding from the reel will progress in the reverse direction. With the cable carrying portion 26 of the reel tapered, the leverage exerted on the spring 19 in the turning of the reel will vary from the smaller to the larger end of the reel and thus be in accord with the tension of the spring as the reel is turned. The result of this is that the weight or load on the cable will move up and down in the turning of the reel at substantially the same tension, and be balanced at its different elevations from the balancer. If the reel were straight, that is, have its cable carrying surface or portion at the same distance from the axis of the reel or parallel therewith, the weight or load on the cable would drop down until the spring reached a tension to support the load. Thereafter, the load would have to be moved against the tension of the spring to either raise or lower the load. Under these conditions, if the load has to be moved any great distance up or down, a special effort is required on the part of the operator to draw the tool down to its lowest position, and this is one of the objections to a straight reel. With the reel tapered, the taper can be regulated or designed so that it will conform to the different tensions of the spring. For instance, in starting to wind up the spring, the cable would be on the small diameter of the reel, and when the spring is wound up nearly to the limit the cable would be on the larger diameter of the reel, and consequently have a leverage to make up for the different tensions of the spring. In some cases, for instance, in setting screws or nuts by a tool suspended from the balancer, a very little movement is required with respect to the tool, and it is preferable to have the reel a little straighter so that the tool will rise of its own accord a certain distance. Then the operator can push the tool down against the work, and then let it go, but where a greater distance of movement for the tool is required, the reel has to be made with a greater taper, so that less exertion will be required to move the tool down to the work, and where an extra long distance is required, the taper of the reel should be still greater to practically balance the different tensions. A reel made in accordance with my invention takes care of the usual conditions encountered in practice and I find that a taper of approximately eight degrees, as shown in Fig. 1, will answer for all general purposes. By varying the tension of the spring, tools or loads of different weights can be used with the balancer. I do not wish to be limited to any particular degree of taper for the reel, as I am claiming in this application the tapered reel broadly. The degree of taper shown in Fig. 1 is for illustrative purposes only, as any degree of taper from slight to marked is within the scope of my invention.

To connect the balancer with an overhead support, such as a beam, arm, ceiling of a room or a trolley, if a movable support is used, I provide the balancer with a suspension hook or equivalent fixture 28 on the upper side of the casing 3. This hook is connected with a vertically disposed axis member 29, having a rotatable or swiveled connection with the top wall of the casing 3, as shown in Figs. 1 and 2. The hook 28 is preferably arranged centrally with respect to the casing 3, but is provided with side lugs 30, 31, in each of which is an aperture 32, whereby the balancer may be connected with the overhead support, through either of these two apertures, should for any reason the balancer fail to hang in line with the load on the cable when the hook is used.

To prevent the cable from displacement out of the groove 27 in the turning of the reel, I provide a guard member 33 in the form of a plate at one side of the reel beneath the casing 3 and secured thereto by screws 34, as shown in Fig. 3. The guard extends across the annular surface 26 of the reel between the marginal flanges 18 and 35 thereon, and is disposed close enough to the reel to prevent the cable from leaving the groove. Thus, the cable is caused to progress from one end of the reel to the other in winding on and unwinding from the reel, thereby making the taper of the reel effective to balance the tension of the spring for the different distances of the load from the balancer.

The reel is hollow to accommodate the spring and thus enables a compact device to be made. The inner surface of the wall 26 is so formed at the spring to provide a flat seat therefor, as shown in Fig. 1. The spring takes up only a part of the interior of the reel, and to hold it in place, as well as protect it from injury and dust, I may enclose the spring on opposite sides by cover plates 36, 37. The inner plate 36 is held between the opposed ends of the sleeve 5 and a hub member 38 on the reel. The outer plate 37 may be held in place by a shoulder 39 on the sleeve 5, as shown in Fig. 2.

The balancer is efficient in operation and simple and inexpensive in construction.

The details of structure shown and described may be variously changed and modified without departing from the spirit and scope of my invention, except as pointed out in the appended claims.

I claim as my invention:

1. A counter-balance of the character described, comprising a reel adapted to have a cable wound thereon, a support for the reel and having a bearing boss at one end of the reel about the axis thereof, a member rotatably mounted in said boss in axial alinement with the reel and extending into the same, a coil spring surrounding said member and having its outer end connected to the reel and its inner end connected to the member, and a worm journaled in said bass and engaging worm teeth on the portion of the member within the boss for adjusting the tension of the spring on turning said member.

2. A counter-balance of the character described, comprising a support, a shaft therein, a reel rotatably mounted on said shaft and adapted to have a cable wound thereon, a sleeve rotatably mounted on said shaft, said support having a bearing boss for the sleeve about the shaft, a coil spring surrounding the sleeve and having its outer end connected to the reel and its inner end connected to the sleeve, and means journaled in said boss and connected with the portion of the sleeve within the boss for turning the sleeve for adjusting the tension of the spring and for holding the sleeve against accidental turning immediately on release of the turning force thereon.

3. A counter-balance of the character described, comprising a reel, a cable adapted to be wound on the reel and having one end connected with the reel and the other end connected with the housing to provide a loop in the cable below the reel, a load supporting fixture carried by the cable exterior of the reel by having a sheave in the loop of the cable, a support for the reel in the form of a housing covering the upper portion only of the reel, spring means for turning the reel in a direction to wind the cable thereon, said housing having depending arms on opposite sides of the reel, and a cross bar connected with and extending between the arms below the reel to provide a stop or abutment for said sheave.

4. A cable clamp comprising a member having three holes therein in offset relation whereby a cable end may be threaded through the holes to provide a loop at one side of the member to receive the free end of the cable for clamping the cable to the member.

5. A counter-balance of the character described, comprising a reel adapted to have a cable wound thereon, a support for the reel, a member rotatably mounted on the support at the center of the reel, a coil spring surrounding said member and having its outer end connected to the reel and its inner end connected to the member, and a worm gear including a worm for turning said member to adjust the tension of the spring, said support having a boss provided with a recess to receive and support the worm, the latter having its inner end forced against the adjacent end wall of the recess by the spring to resist turning of the worm under the normal tendency of the spring to unwind.

6. A counter-balance device of the character described, comprising a reel having a cable carrying portion tapered or inclined to the axis of the reel and provided with a spiral groove about the same, a support for the reel in the form of a housing covering the upper portion only of the reel and leaving the lower portion of the reel exposed, an overhead attaching member connected to the housing above the reel intermediate the ends thereof and in a plane passing through the axis of the reel, and a cable adapted to be wound on the reel in its groove, said cable having one end connected with the larger end of the reel and its other end connected with the housing at one side of the reel to provide a load carrying loop in the cable exterior of the reel and below the same whereby the device will be maintained in balance in all positions of the loop with respect to the ends of the reel as the loop passes through and on opposite sides of said vertical plane in the winding of the cable on and off the reel.

7. A counter-balance of the character described, comprising a support in the form of a housing having side walls, a reel in the housing between said side walls and adapted to have a cable wound thereon, a shaft extending through the reel between said side walls and having one end supported by one of said walls, said reel having an inwardly extending hub providing a rotative support for the reel on the shaft, a sleeve rotatably mounted on the shaft and providing a support therefor at the other side wall, said sleeve extending into the reel along the shaft toward said hub, a coil spring surrounding the sleeve and having its outer end connected to the reel and its inner end connected to the sleeve, and a worm journaled in the housing at the side wall supporting the sleeve and engaging worm teeth on the sleeve whereby the tension of the spring may be adjusted on turning the worm, said side wall having a bearing boss housing and supporting the sleeve and the worm respectively.

8. A counter-balance of the character described, comprising a reel adapted to have a cable wound thereon, a shaft on which the reel is rotatably mounted, a support for the shaft in the form of a housing for the reel, a sleeve rotatably mounted on the shaft, said support having a boss about the shaft at one end of the reel and providing a bearing for the sleeve, a coil spring surrounding the sleeve and having its outer end connected to the reel and its inner end connected to the sleeve, a worm journaled in said boss and engaging worm teeth on the portion of the sleeve within the boss for adjusting the tension of the spring on turning the sleeve, said reel being hollow and open at its end adjacent the boss to receive the spring, and a cover for the spring set in the open end of the reel and engaging an abutment on the sleeve for holding the cover in the open end of the reel.

REINHOLD A. NORLING.